(12) United States Patent
Sieklik et al.

(10) Patent No.: US 12,744,408 B2
(45) Date of Patent: Sep. 22, 2026

(54) METHOD AND APPARATUS FOR COMBINING MAGNETIC AND NON-MAGNETIC MULTI-COIL WIRELESS CHARGING

(71) Applicant: NXP USA, Inc., Austin, TX (US)

(72) Inventors: Ivan Sieklik, Martin (SK); Radek Holis, Karolinka (CZ); Michal Smola, Zlin (CZ)

(73) Assignee: NXP USA, Inc., Austin, TX (US)

( * ) Notice: Subject to any disclaimer, the term of this patent is extended or adjusted under 35 U.S.C. 154(b) by 958 days.

(21) Appl. No.: 18/063,495

(22) Filed: Dec. 8, 2022

(65) Prior Publication Data

US 2024/0195222 A1 Jun. 13, 2024

(51) Int. Cl.

| | |
|---|---|
| ***H02J 50/12*** | (2016.01) |
| ***H02J 7/50*** | (2026.01) |
| ***H02J 7/80*** | (2026.01) |
| ***H02J 50/00*** | (2016.01) |
| ***H02J 50/40*** | (2016.01) |
| ***H02J 50/80*** | (2016.01) |
| ***H02J 50/90*** | (2016.01) |

(52) U.S. Cl.

CPC ................ *H02J 50/12* (2016.02); *H02J 7/50* (2026.01); *H02J 7/80* (2026.01); *H02J 50/005* (2020.01); *H02J 50/402* (2020.01); *H02J 50/80* (2016.02); *H02J 50/90* (2016.02)

(58) Field of Classification Search

CPC ...................................................... H02J 50/90
USPC ......................................................... 320/108
See application file for complete search history.

(56) References Cited

U.S. PATENT DOCUMENTS

| | | | | |
|---|---|---|---|---|
| 9,356,659 | B2 | 5/2016 | Partovi | |
| 2010/0201315 | A1* | 8/2010 | Oshimi | H02J 7/0042 320/108 |
| 2013/0249479 | A1 | 9/2013 | Partovi | |
| 2015/0091388 | A1 | 4/2015 | Golko et al. | |
| 2015/0303699 | A1* | 10/2015 | Wagman | H02J 50/10 307/104 |
| 2015/0357861 | A1* | 12/2015 | Muurinen | H02J 50/12 307/104 |
| 2021/0305848 | A1* | 9/2021 | Song | H02J 50/80 |
| 2024/0186836 | A1* | 6/2024 | Lin | H02J 50/402 |

* cited by examiner

*Primary Examiner* — Ahmed H Omar

(57) ABSTRACT

Aspects of the subject disclosure may include, for example, detecting placement of a receiver coil of a device upon a transmitter coil of a wireless charger, identifying a transmitter coil type of the transmitter coil, identifying a receiving coil type associated with the receiver coil of the device, comparing the transmitter coil type to the receiver coil type, generating a message to move the device to a different position of the wireless charger responsive to detecting a mismatch between the receiving coil type of the device and the transmitting coil type of the wireless charger. Other embodiments are disclosed.

20 Claims, 10 Drawing Sheets

100

200

METHOD AND APPARATUS FOR COMBINING MAGNETIC AND NON-MAGNETIC MULTI-COIL WIRELESS CHARGING

FIELD OF THE DISCLOSURE

The subject disclosure relates to a method and apparatus for combining magnetic and non-magnetic multi-coil wireless charging.

BACKGROUND

Traditional wireless technologies, for charging mobile electronic devices, generally use a wireless power transmitter (Tx) that includes Tx coil(s) to charge such devices via a receiver (Rx) coil included in the devices, to provide a means for untethered charging. In a typical system, the Tx and Rx coils are aligned and of comparable size and/or structure. This requires the user to place their device to be charged in a specific location with respect to the wireless charger, which can be an undesirable restriction. In addition, there can be an interoperability requirement between different types of Tx and Rx coils, such as magnetic coils and non-magnetic coils associated with different commercial mobile electronic devices, such as mobile phones.

BRIEF DESCRIPTION OF THE DRAWINGS

Reference will now be made to the accompanying drawings, which are not necessarily drawn to scale, and wherein.

DETAILED DESCRIPTION

Figure 1:
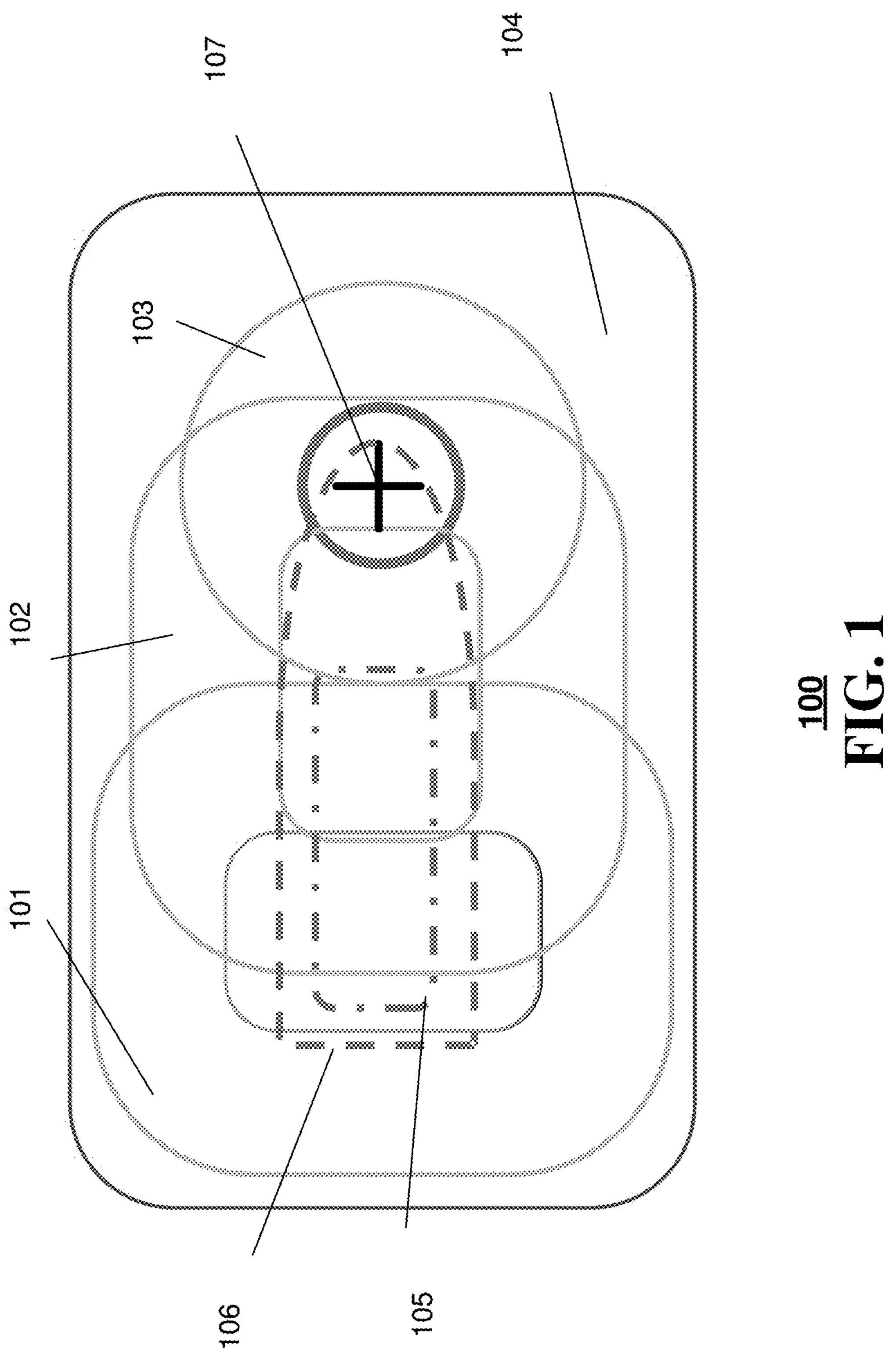
FIG. 1 shows an example, non-limiting embodiment of a wireless charger in a schematic representation, in accordance with various aspects described herein.

The subject disclosure describes, among other things, illustrative embodiments for effective alignment and wireless power transfer between Tx and Rx coils. Other embodiments are described in the subject disclosure.

One or more aspects of the subject disclosure includes a wireless charger having a plurality of coils, wherein at least one of the plurality of coils overlaps another coil of the plurality of coils, a power source, a power converter coupled to the power source and the plurality of coils, a processing system including a processor, and a memory that stores executable instructions that, when executed by the processing system, facilitate performance of operations. The operations can include scanning each of the plurality of coils for a flow of electrical current, determining from the scanning, placement of a first device above a first coil of the plurality of coils, wherein the first coil comprises a first coil type, receiving identification information from the first device, determining from the identification information whether the first coil type matches a first charging configuration of the first device, and responsive to the determining that the first device needs to be placed on a second coil of the plurality of coils, generating a first message, wherein the second coil comprises a second coil type that differs from the first coil type.

One or more aspects of the subject disclosure includes a method for identifying, by a processing system of a wireless charger, a transmitter coil from a plurality of transmitter coils of the wireless charger on which a receiver coil of a device has been placed upon, the processing system including a processor, identifying, by the processing system, a transmitter coil type of the transmitter coil, receiving, by the processing system, a signal from the device, identifying, by the processing system, according to the signal a receiving coil type associated with the receiver coil of the device, and generating, by the processing system, a message to move the device to a different position of the wireless charger responsive to detecting a mismatch between the receiving coil type of the device and the transmitting coil type of the wireless charger, the different position including a different transmitter coil from the plurality of transmitter coils of the wireless charger, and the different transmitter coil having a different transmitter coil type that is compatible with the receiver coil type.

One or more aspects of the subject disclosure includes a non-transitory, machine-readable storage medium, comprising executable instructions that, when executed by a processing system including a processor, facilitate performance of operations. The operations can include detecting placement of a receiver coil of a device upon a transmitter coil of a plurality of transmitter coils of a wireless charger, identifying a transmitter coil type of the transmitter coil, identifying a receiving coil type associated with the receiver coil of the device, comparing the transmitter coil type to the receiver coil type, generating a message to move the device to a different position of the wireless charger responsive to detecting a mismatch between the receiving coil type of the device and the transmitting coil type of the wireless charger, the different position including a different transmitter coil from the plurality of transmitter coils of the wireless charger, and the different transmitter coil having a different transmitter coil type that is compatible with the receiver coil type.

In the subject disclosure, a wireless charging transmitter (Tx) or Tx coil refers to an apparatus that can be configured to wirelessly charge a mobile device via a corresponding receiver (Rx) coil included in the mobile device. The Rx coil can be used to extract energy from the Tx coil, which is then supplied to a battery of the mobile device.

Good alignment of Rx and Tx coils is very beneficial in terms of parameters, such us, coupling, power delivery capability, foreign object detectability. On the other hand, requiring good alignment may be inconvenient from a user's perspective where freedom of Rx coil placement on Tx coil is desired. The subject disclosure brings a solution on how to achieve good alignment while maintaining freedom of user placement of an Rx coil on a Tx coil within space limitations of a wireless charger. Innovative permanent magnets distributed in a multi-coil Tx charger with detection algorithms for optimal Tx coil selection guidance are introduced. The subject disclosure, for example, combines magnetic and non-magnetic Tx coils in a same wireless charger that is configured to scan and detect whether an Rx coil of a mobile device is compatible with a select one of the Tx coils of the wireless charger, and under certain circumstances, taking corrective action if a mismatch in coil types is detected.

Most smartphones are certified as compliant according to a Baseline Power Profile (BPP) or Extended Power Profile (EPP) by the Wireless Power Consortium (aka Qi consortium). The Qi consortium defines standards for each power profile. Certain smartphones may not be fully compliant with the Qi consortium. Consequently, interoperability may not exist between a magnetic Rx coil of a smartphone and a non-magnetic Rx coil of the smartphone (e.g., Qi Consortium 1.3 EPP Rx) within an active area of a wireless charger. However, the Qi Consortium 2.0 standard addresses interoperability of a magnetic Rx coil of a smartphone with a non-magnetic Rx coil by delivering limited power and charge time. In addition, unwanted power loss in magnets (overheating) can occur if the magnets are exposed to an alternating magnetic field such as when they are placed in the center of a Tx coil of a wireless charger. During wireless charging and because of a possible large gap between magnetic and non-magnetic Tx coils (separated Tx coil assemblies), a blind area with no power transfer can exist. In addition, limited charging power can occur when the Rx coil of a smartphone is placed on an inappropriate Tx coil type such as, for example, a non-magnetic Rx coil of the smartphone on a magnetic Tx coil of the wireless charger.

Referring now to FIG. 1, a schematic diagram is shown illustrating an example, non-limiting embodiment of a wireless charging transmitter 100 (referred to herein as Tx charger 100) in accordance with various aspects described herein. The Tx charger 100 of FIG. 1 can facilitate the charging of an Rx coil of a mobile device (e.g., a smartphone) placed upon the Tx charger 100 and also detecting and informing a user of the mobile device of a possible Rx and Tx coil profile misalignment and/or mismatch.

In the embodiments of FIG. 1, the Tx charger 100 can consist of three Tx coils, 101, 102, and 103, respectively. Tx coils 101 and 102 can be characterized as Non-Magnetic Power Profile (N-MPP) coils (referred to herein as N-MPP coils 101 and 102). The N-MPP coils 101 and 102 enable freedom of placement of an Rx coil of a mobile device on either of the N-MPP coils 101 and 102. Tx coil 103 can be characterized as a Magnetic Power Profile (MPP) coil (referred to hercin as MPP coil 103). MPP coil 103 is intended for an aligned placement of an Rx coil of a mobile device onto the MPP coil 103.

A surface 104 of the Tx charger 100 can visually indicate preferred locations on the surface 104 as depicted by references 105, 106 and 107, respectively. References 105, 106 and 107 can be represented by grooves on the surface 104 and/or Light Emitting Diodes (LEDs) highlighting such grooves; thus, indicating to a user that there are two places in close vicinity to each other which are capable of power transfer via the N-MPP coils 101 and 102 and a third location capable of power transfer via MPP coil 103. The first indication 105 can depict a marking across the center of the N-MPP Tx coils 101 and 102. The second indicator 106 depicts a marking across the N-MPP Tx coils 101 and 102 and the MPP coil 107. The third indicator 107 depicts a marking of a single spot (in the middle of the MPP Tx coil 103). The active area for N-MPP coil 102 can overlap the active area of the MPP coil 103. The N-MPP coils 101 and 102 support charging of mobile devices compatible with BPP and EPP profiles, while the MPP coil 103 supports charging of mobile devices compatible BPP. EPP or MPP profiles.

It is preferable, however, for the user to choose an active area closer to N-MPP coils 101 and/or 102 when the Rx coil of the mobile device is not compatible with the MPP coil 103. However, if a user places a mobile device with an incompatible Rx coil close or directly on the MPP coil 103, power transfer can still be possible but limited. If this happens, the Tx charger 100 can be configured to detect this use case, identify a mismatch between the Rx coil of the mobile device and the MPP coil 103, and inform the user to move the mobile device to a different area for a better and faster charging process. Even when a match is detected between the Rx coil of the mobile device and the MPP coil 103 (or the N-MPP coils 101 or 102), the Tx charger 100 can be configured to detect a misalignment between the Rx coil of the mobile device and the MPP coil 103 (or the N-MPP coils 101 or 102). Misalignment can be detected when the power transfer is sub-optimal. In this instance, the Tx charger 100 can be further configured to instruct the user to improve the alignment of mobile device within the active area chosen by the user.

Figure 2:
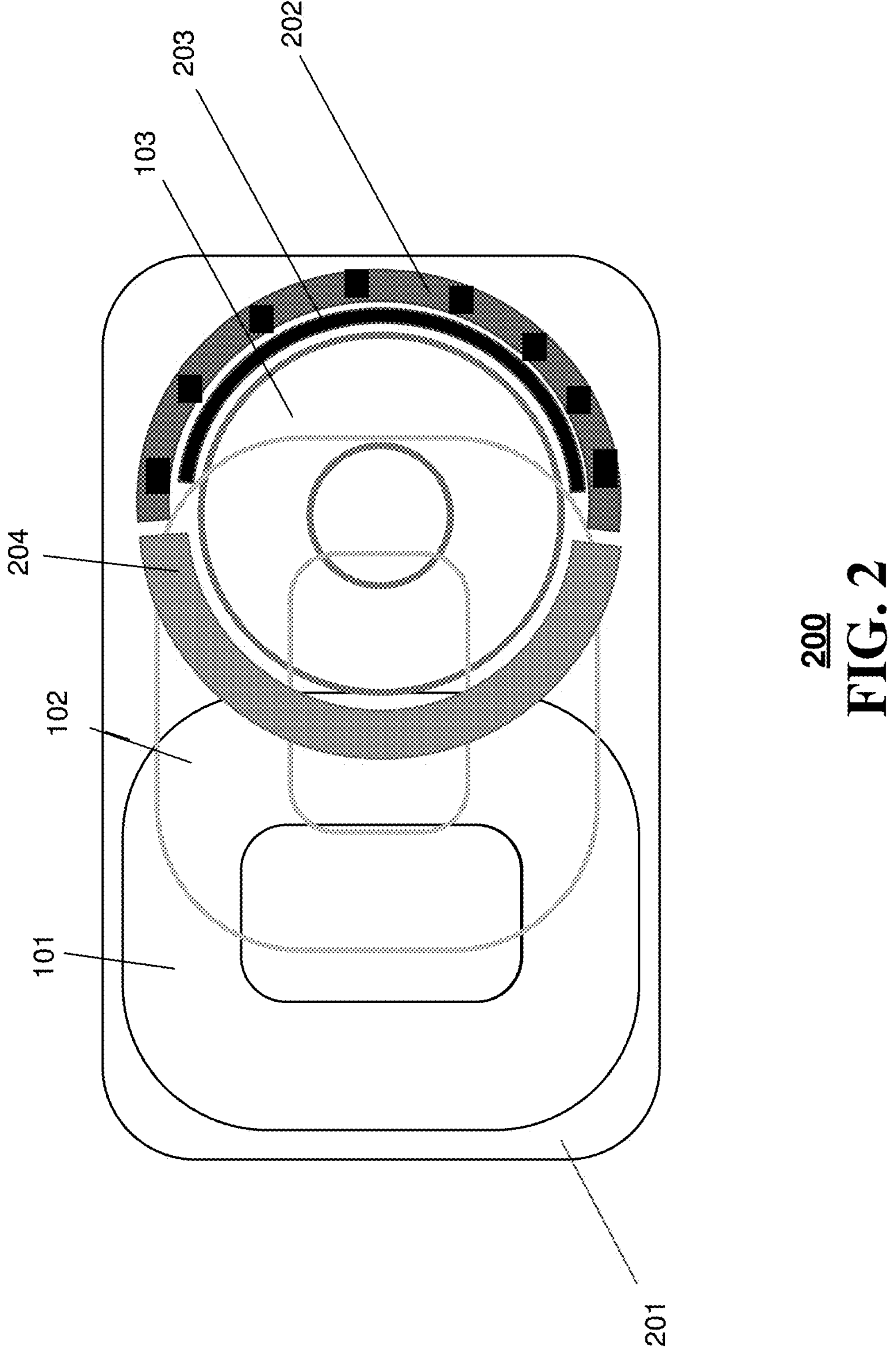
FIG. 2 shows an example, non-limiting embodiment of the wireless charger of FIG. 1, in accordance with various aspects described herein.
Figure 3:
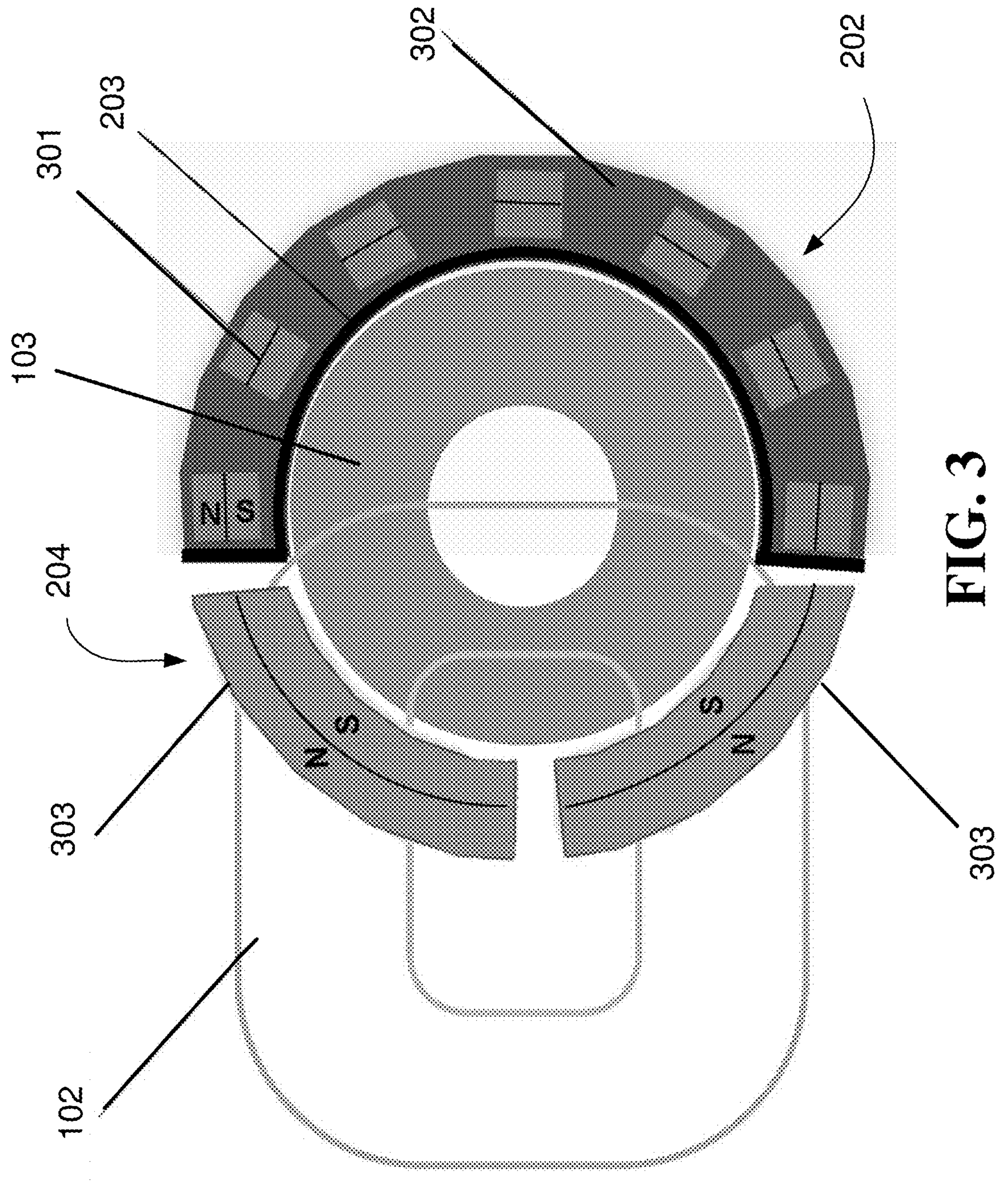
FIG. 3 shows an example, non-limiting embodiment of the wireless charger of FIG. 2 in a detail, in accordance with various aspects described herein.

In one example, non-limiting embodiment of the subject disclosure, shown in FIG. 2, the wireless Tx charger 200 comprises a ferrite plane 201, the N-MPP coil 101, the N-MPP coil 102, and the MPP coil 103. In one embodiment, the ferrite plane 201 is located below the N-MPP coils 101, 102 and the MPP coil 103. In one embodiment, the N-MPP coil 102 overlaps N-MPP coil 101, and the MPP coil 103 overlaps N-MPP coil 102. The N-MPP coils 101 and 102 can correspond to standard Qi consortium MP-A13 coils. In one embodiment, a Neodymium magnetic section 202 can be placed around a half-circumference of the MPP coil 103. As depicted in FIG. 3, the Neodymium magnetic section 202 can consist of multi-pole Neodymium magnetics 301 placed on various locations of a nonconductive surface 302. It will be appreciated that the volume, magnetic material and orientation of the multi-pole Neodymium magnetics 301 can be redesigned to adapt an attachment force or to support desired Rx coil types.

In one embodiment a wireless charger can include a single MPP coil with a full circumference Neodymium magnet about the MPP coil. In this embodiment, the strength of the Neodymium magnet need not be strong since the full circumference can align reasonably well with a mobile device having an Rx coil with a full circumference Neodymium magnet of similar strength. In the Tx charger 200 of FIG. 2, the multi-pole Neodymium magnets 301 can be configured with greater magnetic strength than those used in a single MPP coil wireless charger to further assist in aligning a corresponding full circumference Neodymium magnet around an Rx coil of the mobile device.

In another example, non-limiting embodiment of the subject disclosure, the wireless Tx charger 200 optionally further comprises a half circumference ferrite wall 203 to separate the MPP coil 103 and the Neodymium magnetic section 202. The half circumference ferrite wall 203 can reduce wireless coupling of the MPP coil 103 and the Neodymium magnetic section 202 while the MPP coil 103 is actively in use during a charging cycle.

In another example, non-limiting embodiment of the subject disclosure, the wireless Tx charger 200 optionally further comprises multi-pole ferrite magnets 204 (depicted in FIG. 3 as two quarter multi-pole ferrite magnets 303). The multi-pole ferrite magnets 204 can be placed along the half-circumference around the MPP coil 103 on the opposite side of the Neodymium magnet section 202. A portion of the Ferrite wall 203 can also be used to separate the Neodymium magnet section 202 from the multi-pole ferrite magnets 204, as shown in FIG. 3. The ferrite wall 203, in one example, non-limiting embodiment can have the same height as the Neodymium magnet section 202.

The Neodymium magnet section 202 is placed on the edge of the Tx charger 200 to ensure that a majority of an alternating magnetic field of the MPP coil 103 (during a charging cycle) is not intersecting with the Neodymium magnet section 202. This approach significantly reduces unwanted eddy currents which are generating power loss (due to heating of the Neodymium magnet section 202).

In addition, the multi-pole ferrite magnets 204 can be placed in such a way that they overlap with the N-MPP coil 102 with no (or negligible) power loss. The multi-pole Ferrite magnets 204 do not consist of conductive materials like the Neodymium magnet section 202. Consequently, they are not subject to Eddy currents. The multi-pole Ferrite magnets 204 strength is weaker than the Neodymium magnet section 202. Therefore, use of the multi-pole Ferrite magnets 204 in combination with the Neodymium magnet section 202 can be optional to slightly increase the attachment alignment with a corresponding full circumference Neodymium magnet of the Rx coil of a mobile device. The ferrite wall 203 can serve to increase shielding capability of magnets and further decrease parasitic loss in them.

The configuration of the Neodymium magnet section 202, ferrite wall 203 and multi-pole ferrite magnets 204 about the MPP coil 103 allows for an overlap area between N-MPP coil 102 and MPP coil 103 to be significant without affecting the operations of either the N-MPP coil 102 or MPP coil 103 when either is engaged during a charging cycle. If the overlap area is reduced between the N-MPP coil 102 and MPP coil 103 (effectively separating the coils), then a full circle magnetic ring can be created about the MPP coil 103. However, this is not practical when a surface area of the Tx charger 200 must be kept small for certain use cases such as, for example, automotive applications.

Power Loss Calculation & Control (PLCC) (required for accurate Foreign Object Detection (FOD)) can be dependent on Rx coil of a mobile device positioning as magnetic field shape is changing with this position, especially, in cases when conductive magnets would be placed in close vicinity or inside of an active charging area. PLCC limits power to achieve power loss below a desired threshold. Consequently, configuring the Neodymium magnet section 202 to half a circumference around the MPP coil 103, reduces interference with N-MPP coil 101 and N-MPP coil 102. Although the Neodymium magnet section 202 may cause some interference with the MPP coil 103, it is manageable. In particular, the positioning of an Rx coil of a mobile device on the MPP coil 103 is ensured by the Neodymium magnet section 202, while the parasitic power loss can be compensated (subtracted).

When an Rx coil of a mobile device is placed on the MPP coil 103 and is optimally aligned, power transfer can be extended to full potential power. But if the Rx coil is moved towards the Neodymium magnet section 202, the calculated power loss is increased. When this happens, the Tx charger 200 can be configured to reduce power charging via the MPP coil 103 to mitigate the risk of overheating a potential foreign object. In such a case, the Tx charger 200 can be configured to inform the user of the mobile device that limited charging is occurring, and that the user should re-arrange the mobile device placement because the mobile device is operating on a non-suitable coil of the Tx charger or a foreign object has been introduced. In other embodiments, the Tx charger 200 can be configured to inform the user of a mobile device to be charged that a combination of N-MPP coils 101 or 102 or MPP coil 103 is mismatched with the Rx coil of the mobile device.

It will be appreciated that the Tx charger 200 can be adapted for other embodiments. For example, if there is a need to support multiple MPP coils with various magnets, more magnets can be distributed on an edge of the MPP coil assembly with the following coil distribution: MPP Type A, EPP, EPP, MPP Type B to reduce interference with other N-MPP coils.

Figure 4:
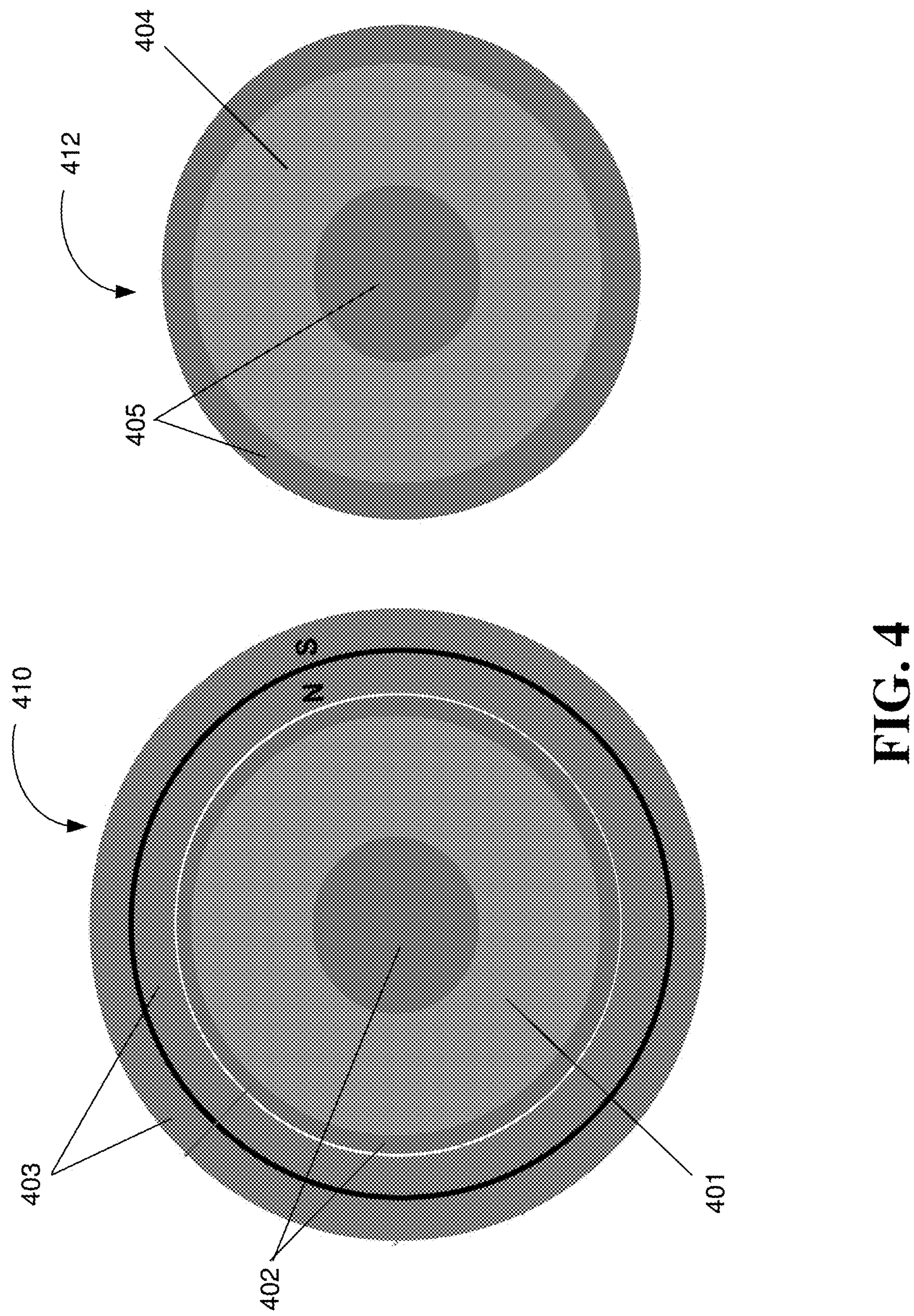
FIG. 4 shows an example, non-limiting embodiment of a Magnetic Power Profile Rx coil and a Non-Magnetic Power Profile Rx coil, in accordance with various aspects described herein.

FIG. 4 shows an example, non-limiting embodiment of an Rx coil 410 and an Rx coil 412 of differing mobile devices (e.g., smartphones), in accordance with various aspects described herein. In one embodiment, a mobile device can include an Rx coil 410 that consists of a single circular coil 401 placed above a ferrite plane 402. A Neodymium magnet 403 is placed along a full circumference around coil 401. This type of mobile device can be used with wireless chargers including one or more Tx coils that are configured for an MPP profile. In one embodiment, the wireless chargers can be configured for 360 kHz operating frequency during a charging cycle. In another embodiment, the Rx coil 412 of a mobile device can consist of a single coil 404 placed above a ferrite plane 405. This type of mobile device can be used with wireless chargers including one or more Tx coils that are configured for BPP and EPP profiles with a 127 kHz operating frequency during a charging cycle.

The Tx charger 200 of the subject disclosure combines N-MPP and MPP profiles in one design to satisfy of the Rx coils 410 or 412 depicted in FIG. 4, thereby expanding its application to a larger pool of mobile devices of differing models. The Tx charger 200 of FIG. 2 can be configured to detect placement of a mobile device on any of the N-MPP coils 101, 102 or MPP coil 103, and guide the user as to an optimal placement of the mobile device based on a compatibility of the mobile device with any one of these coils.

Figure 5:
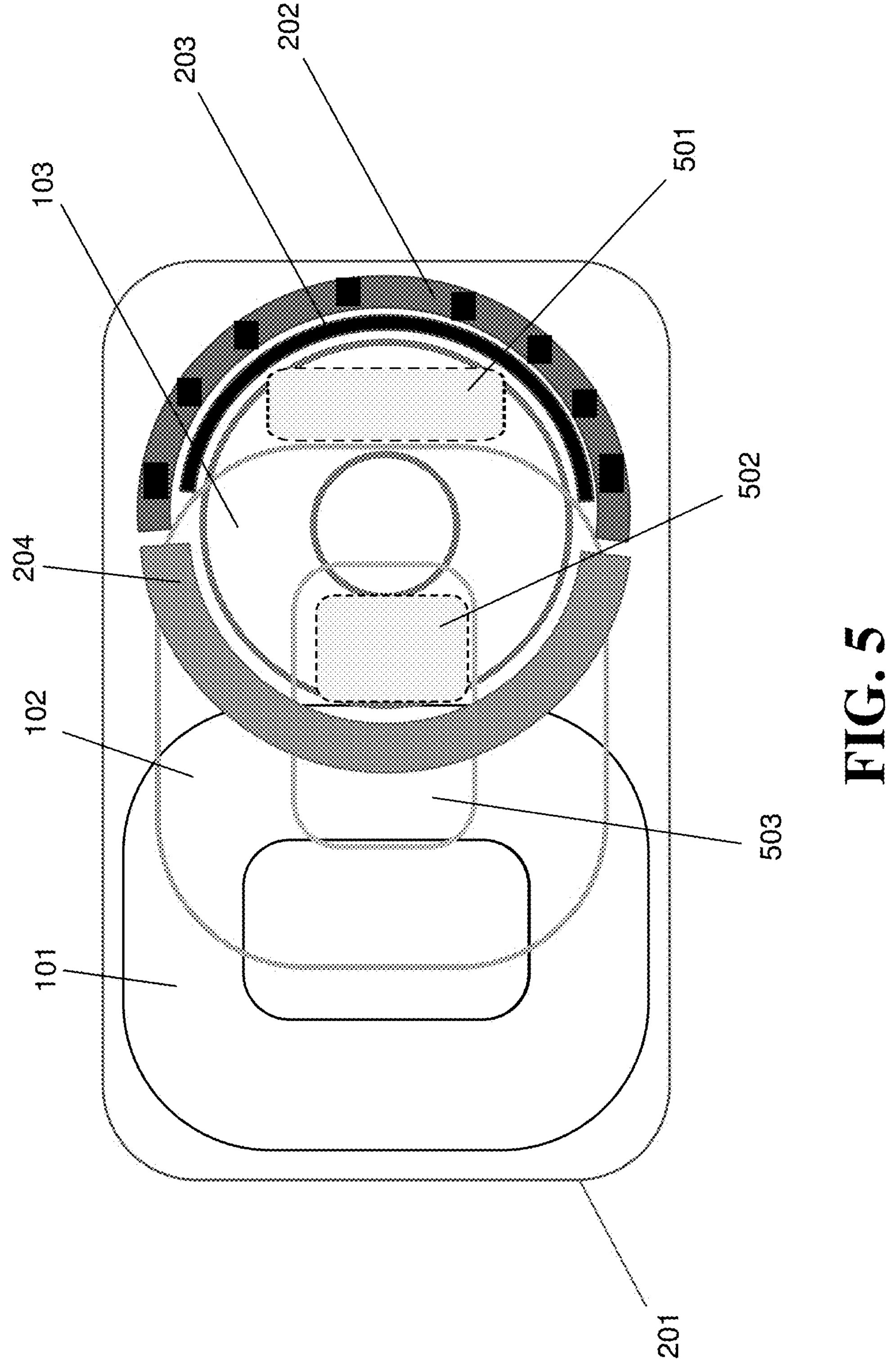
FIG. 5 shows an example, non-limiting embodiment of the wireless charger of FIG. 2, in accordance with various aspects described herein.

It will be appreciated that the Tx charger 200 can be further adapted in accordance with FIG. 5. In this illustration, two additional ferrite sections 501 and 502 can be placed below the MPP coil 103. Ferrite section 502 can be placed in a gap 503 of the N-MPP coil 102. Ferrite sections 501 and 502 can further enhance the charging capability of the MPP coil 103. It will be further appreciated that vertical layers of the Tx coils can be swapped to better comply with Qi Consortium requirements or to tune the coupling for MPP and N-MPP Rx coils. For example, MPP Tx coils may require a vertical distance of 1-2 mm but N-MPP Tx coil may require distance of >=3 mm. Consequently, it is beneficial to place an MPP Tx coil on top of N-MPP coils.

Figure 6A:
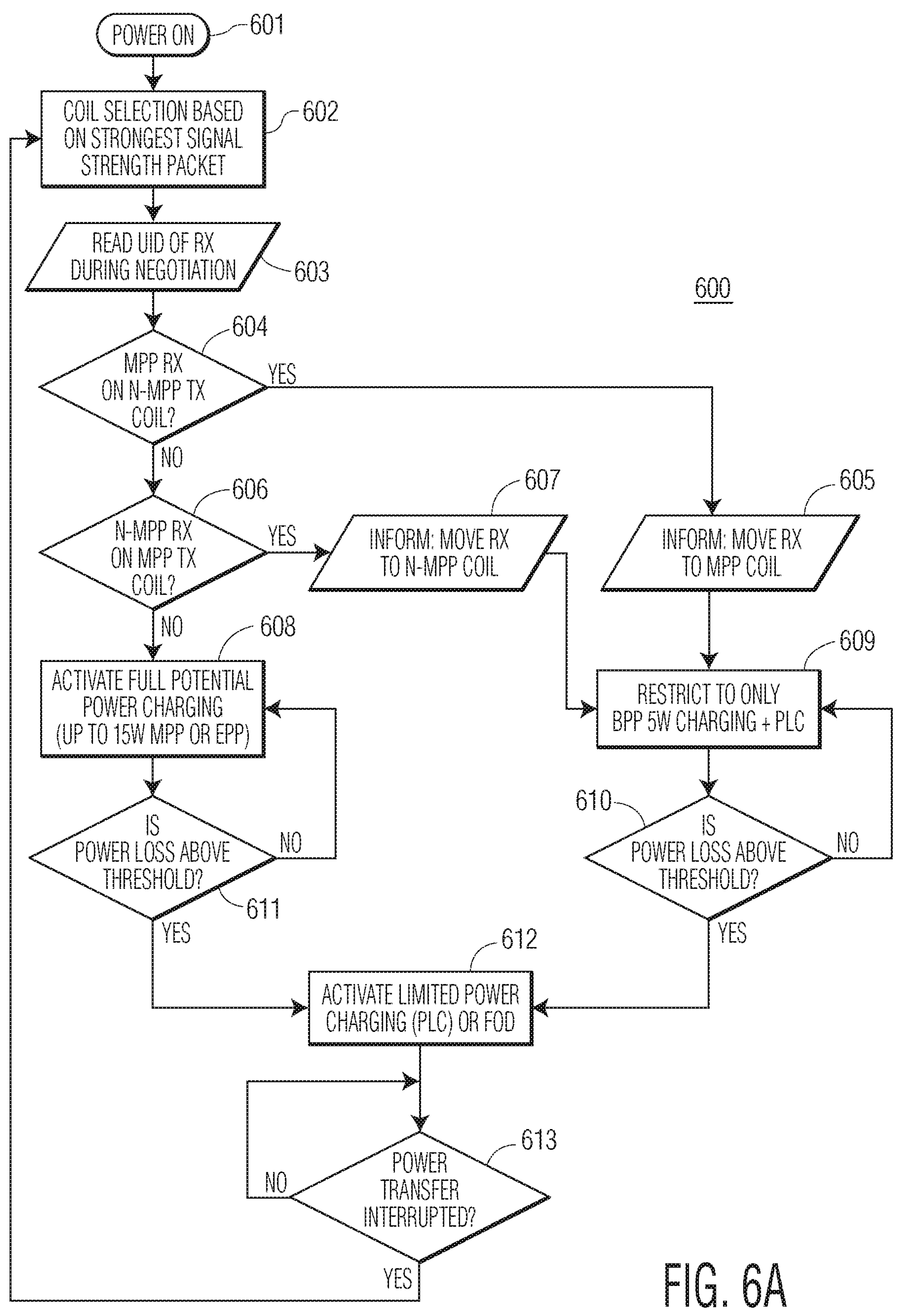
FIG. 6A shows an example, non-limiting embodiment of a flowchart describing a method of wirelessly charging a mobile device having magnetic and non-magnetic coils, in accordance with various aspects described herein.

FIG. 6A shows an example, non-limiting embodiment of a flowchart describing a method 600 of wirelessly charging a mobile device having magnetic and non-magnetic coils, in accordance with various aspects described herein. The method 600 can begin at step 601 where a wireless charging system (referred to herein as the Tx charger) is powered on. At step 602 the Tx charger detects whether a particular Tx coil from its plurality of Tx coils has been wirelessly coupled to an Rx coil of a mobile device. In one example, non-limiting embodiment, this may be achieved by periodic scanning each of the plurality of Tx coils of the Tx charger to detect a flow of electrical current to detect the strongest signal strength, indicating a wireless coupling of a particular charger Tx coil with an Rx coil has occurred. After it has been determined that a particular Tx coil has been wirelessly coupled to an Rx coil of the mobile device, the Tx charger at step 603 determines an Rx coil type of that Rx coil based on an identity of the mobile device (e.g., Universal ID or UID) obtained from modulated current flow caused by the mobile device via the wireless coupling between the Tx coil and Rx coil.

At step 604, the Tx charger examines whether there is a match or a mismatch between a Tx coil type of the detected Tx coil and the Rx coil type of the Rx coil of the mobile device. For example, suppose the coil type of the Tx coil is an N-MPP Tx coil, while the coil type of the Rx coil is an MPP Rx coil. When a mismatch such as this occurs, the Tx charger can be configured to generate a message informing the user at step 605 that the user needs to move the mobile device to a different location on a surface of the Tx charger; particularly, a request to move the MPP Rx coil to a MPP Tx coil of the Tx charger. The message can be an audible message and/or a visual message presented in a display of the Tx charger, lighting of LEDs on a top surface of the Tx charger, audio speaker of the Tx charger, or any combinations thereof. If instead the coil type of the Rx coil is an N-MPP Rx, then the Tx charger can proceed to step 606 and confirm that N-MPP Rx coil is not placed on an MPP Tx coil. If, however, the N-MPP Rx coil is placed on an MPP Tx coil, then the Tx charger generates a message (that is presented in a similar manner as described above) informing the user at step 607 that the user needs to move the mobile device to a different location on the surface of the charger; preferably, moving the N-MPP Rx coil to a N-MPP Tx coil of the Tx charger.

It is noted that the notification that the user needs to move the Rx coil implies that there is an available Tx coil which can support faster charging (higher power level). However, if the mobile device is not moved, then the charging will occur in the BPP regime.

After the determination of a match or mismatch is completed, the Tx charger will activate full power charging or restricted power charging once the mobile device is placed in a proper location. More specifically, if the answer to step 606 is negative (i.e., match occurred), the Tx charger will activate at step 608 full power charging (up to 15 W MPP or EPP). On the other hand, if a mismatch occurred (i.e., after steps 605 and 607), the Tx charger will restrict at step 609 charging to BPP 5 W, and follow a Power Loss Calculation (PLC) algorithm to keep the losses low so that overheating does not occur.

At steps 610 and 611, the Tx charger checks whether the power loss (between the Tx and Rx coils) is above a threshold. If the answer is affirmative in either step, the Tx charger may activate at step 612 limited power charging or activate Foreign Object Detection (FOD) to confirm whether a foreign object is causing the power loss. If the answer is negative in either of steps 610 and 611, then the Tx charger returns to step 608 or 609 and continues as before.

After activating limited power charging at step 612, the Tx charger inquires at step 613 whether power transfer has been interrupted. If the answer is negative, the Tx charger returns to step 612. If the answer is affirmative, the Tx charger returns to step 602 where it scans through each of the Tx coils of the Tx charger to select a Tx coil based on a strongest signal strength from detected current flow in one of the Tx coils.

Figure 6B:
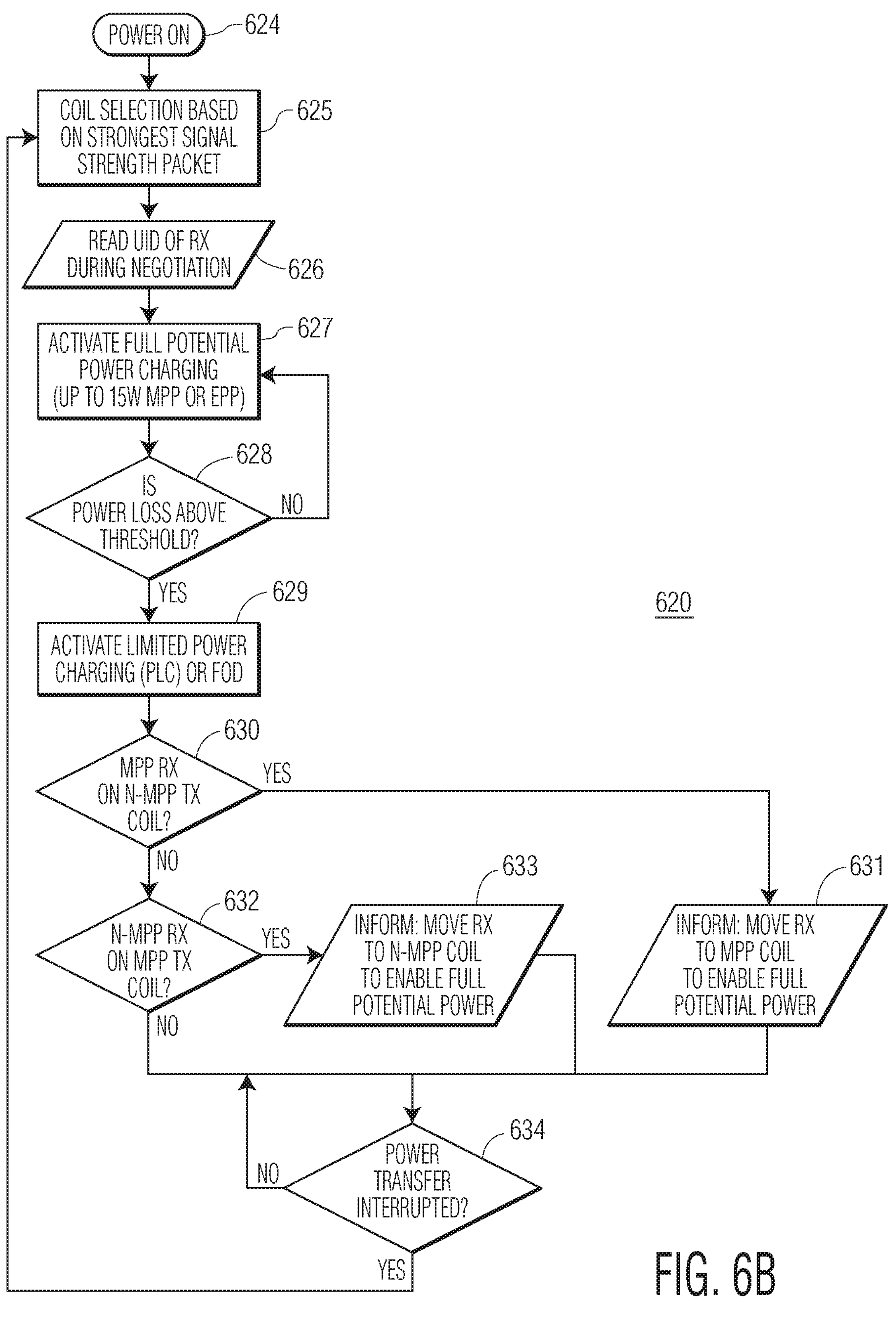
FIG. 6B shows an example, non-limiting embodiment of a flowchart describing a method of wirelessly charging a mobile device having magnetic and non-magnetic coils, in accordance with various aspects described herein.

FIG. 6B shows an example, non-limiting embodiment of a flowchart describing a method 620 of wirelessly charging a mobile device having magnetic and non-magnetic coils, in accordance with various aspects described herein. The method 620 of FIG. 6B illustrates alternative embodiments to the embodiments described earlier for FIG. 6A. The method 620 can begin at step 624 where the Tx charger is powered on. At step 625 the Tx charger detects a Tx coil (wirelessly coupled to a Rx coil of a mobile device) based on a strongest signal strength of scanned Tx coils of the Tx charger. At step 626 the Tx charger identifies the mobile device based on its UID received in a manner described earlier, and based on its identity, can determine the coil type of the Rx coil of the mobile device. At step 627, the Tx charger activates full power charging (up to 15 W MPP or EPP). Subsequently, the Tx charger inquires at step 628 whether the power loss is above a threshold. If the answer is negative, the method returns to step 627 and continues the charging process. On the other hand, if the answer is affirmative, then the Tx charger activates at step 629 limited power charging or FOD.

Following the activation of limited power charging (regardless of regime power BPP. EPP or MPP), the Tx charger performs match/mismatch identification, as before, at step 630 (MPP Rx coil on N-MPP Tx coil?) and step 632 (N-MPP Rx coil on MPP Tx coil?). If a mismatch has occurred, the Tx charger generates a message (in a manner described earlier) to inform the user to move the mobile device as in step 631 (move MPP Rx coil to MPP Tx coil) or step 633 (move N-MPP Rx coil to N-MPP Tx coil) to enable full charging power at a different location on the surface of the Tx charger.

After the mobile device has been moved for faster charging, the Tx charger at step 634 inquires whether power transfer has been interrupted. If the answer is negative, the Tx charger returns to step 634. On the other hand, if the answer is affirmative, then the Tx charger returns to step 625 to scan Tx coils and select a Tx coil based on a strongest signal strength.

The methods 600, 620 of FIGS. 6A and 6B can be further adapted to detect misalignment of an Rx coil of a mobile device that matches a Tx coil of the Tx charger. Misalignment can be characterized as a misplacement of the Rx coil of the mobile device relative to an optimal placement above a matching Tx coil of the Tx charger. The Tx charger can be adapted to detect a misalignment based on the Tx charger detecting less than an expected current flow between the Tx coil and the Rx coil. In this instance, the Tx charger can be configured to generate a message to inform the user to realign the mobile device in the active area of the Tx coil in question. LED lighting of the active area of the Tx coil can serve as a guide for the user to improve an alignment between the Rx coil and the Tx coil. Audio guidance can also be used to inform the user when alignment is optimal. The Tx charger can monitor when the alignment has been improved based on an increase in a transfer of power between the Tx coil and the Rx coil.

While for purposes of simplicity of explanation, the respective processes are shown and described as a series of blocks in FIG. 6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The above-described wireless charger and mobile device (e.g., smartphone) to be charged, may be part of a system described below and shown in FIG. 7 and FIG. 8.

Figure 7:
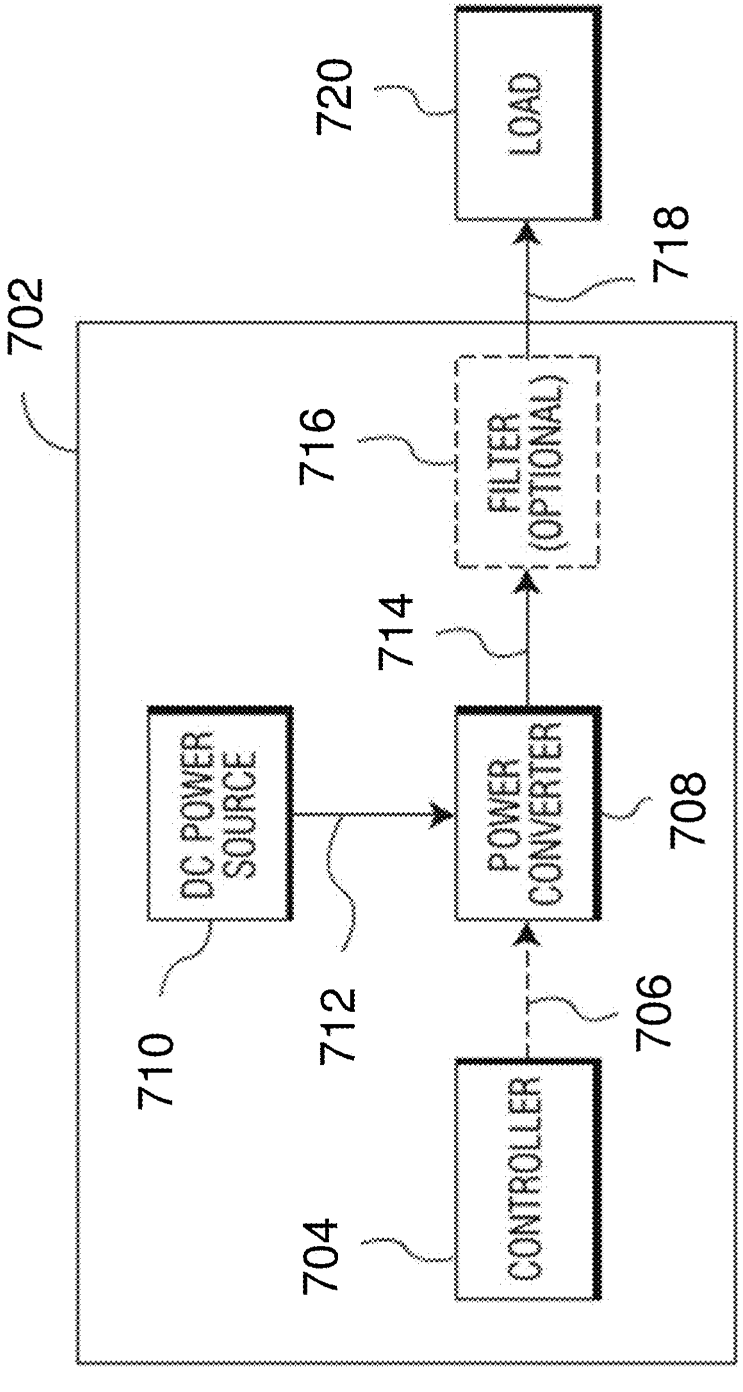
FIG. 7 shows an example, non-limiting embodiment of a power generation system and a load, in accordance with various aspects described herein.

FIG. 7 depicts an example of a power generation system 702 and a load 720. The power generation system 702 provides power to drive the load 720. The power generation system 702 includes a controller 704 coupled to a power converter 708. The power converter 708 is coupled to a DC (Direct Current) power source 710 and to the load 720. The controller 704 sends a pulse width modulation (PWM) digital signal 706 to the power converter 708 to control a power output 714 of the power converter 708. The DC power source 710 provides power 712 to the power converter 708. The power converter applies the PWM signal 706 from the controller 704 to the received power 712 to generate a modulated analog power output 714. In some embodiments, the power output is an AC (Alternating Current) waveform and is applied to the load 720 through an optional filter 716 to smooth the analog power output. In other non-limiting embodiments, the power output may be pulsed but have a single polarity. The resulting filtered power 718 from the power generation system 702 is applied to drive the load 720.

The power source 710 and the power converter 708 may be designed for any particular load including inductive battery chargers (i.e., for the application disclosed herein). Because the digital PWM signal is used only as a control input, it may be applied to multiple power converters simultaneously and the signal may be inverted to feed multiple inputs of a single power converter. Such inversion, where required, may be done within the controller 704, or in other embodiments, may be done externally, for instance within the power converter 708.

The power converter 708 may take different forms depending on the nature of the load 720, such as a Class-D converter, push-pull converter, half-bridge converter, full-bridge converter or another form. The PWM signal output 706 of the controller 704 is configured to provide an output suited to the particular type of converter.

Figure 8:
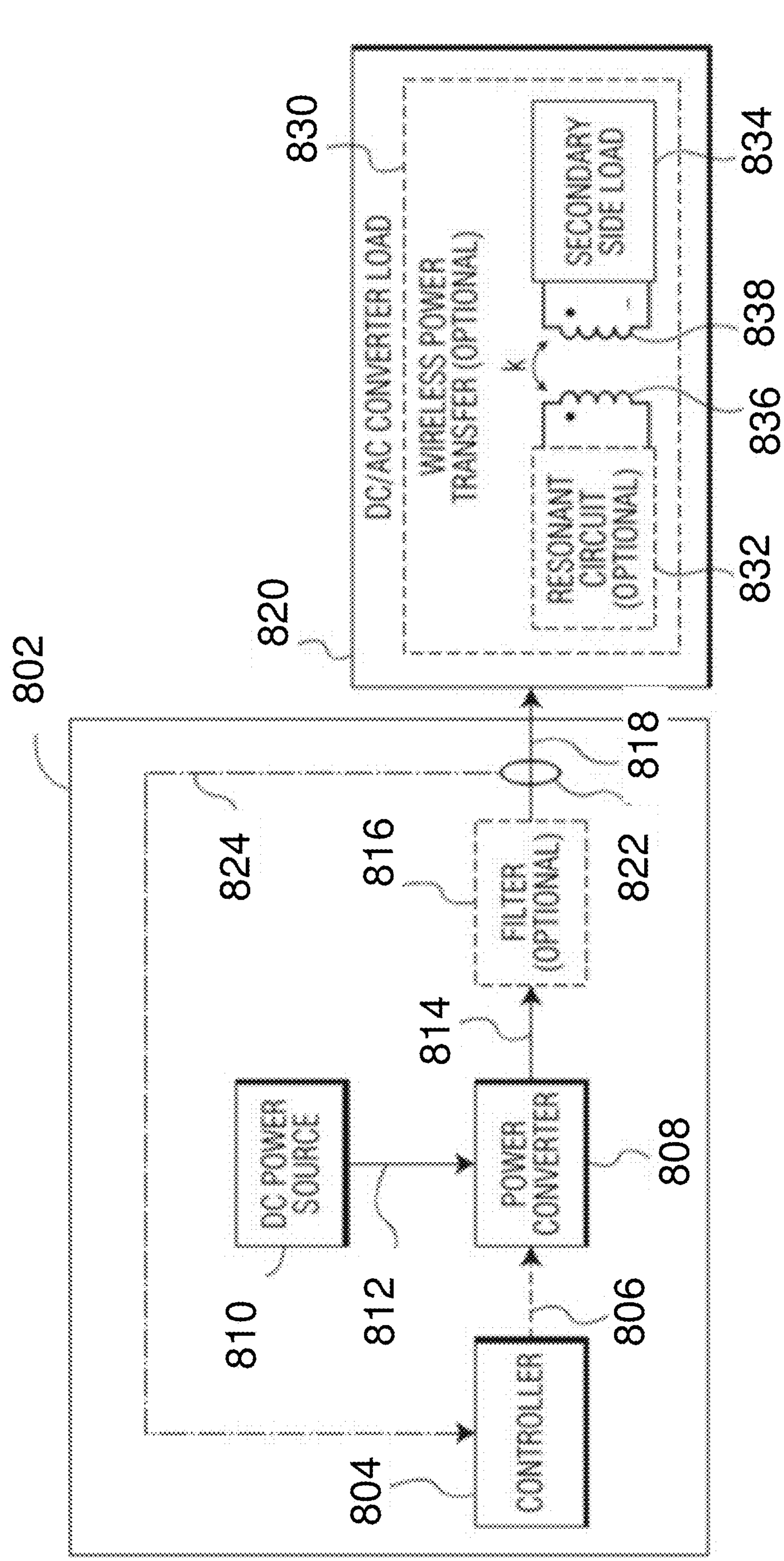
FIG. 8 shows an alternative example, non-limiting embodiment of a power generation system and a load for wireless charging, in accordance with various aspects described herein.

FIG. 8 depicts another example of a power generation system 802 and a load 820 that is configured for wireless charging. In some embodiments, the load 820 includes a wireless power transfer system 830, typically with a resonant circuit 832 coupled through a primary coil 836 to a secondary coil 838 of a secondary side load 834. The wireless power transfer system 830 can be adapted with multiple resonant circuits 832 and corresponding primary coils 836. In one embodiment, for example, the wireless power transfer system 830 can include three resonant circuits 832 with three primary coils 836 that can represent the three Tx coils described above (see FIGS. 1, 2 & 5). In this configuration, the controller 804 can be configured to scan through each of the resonant circuits 832 of the wireless power transfer system 830 to determine if a corresponding secondary coil 838 (e.g., an Rx coil of a mobile device) is wirelessly coupled to one of the resonant circuits 832 via its corresponding primary coil 836. The controller 804 can be further configured to perform either of the methods of FIGS. 6A and 6B.

Referring back to FIG. 8, the resonant circuit 832 drives power through the coils matching the characteristics of the load. In some embodiments, the secondary side load 834 represents a battery (e.g., the mobile device to be charged as disclosed herein) and the resonant circuit 832 represents a wireless charging pad or plate (e.g., the Tx coil disclosed herein). Such a configuration is suitable for charging small batteries for wireless communications devices, larger batteries for tools, and still larger batteries for vehicles. Any of a variety of different charging scenarios may be accommodated, by appropriate modification of the DC power source 810 and the power converter 808.

In this example, a controller 804 is connected to a power converter 808 to provide a PWM signal, or a PWFM (pulse width and frequency modulated signal) 806 to the power converter 808. The power converter 808 is configured to drive the resonant circuit and may produce an AC output. It may, for instance, be a full or half-bridge power converter that generates a power output 814 by modulating input power 812 from a connected DC power source 810. An AC power output 814 from the power converter may optionally be processed through filter 816 to generate the final filtered AC power output 818 supplied to the power converter load 820.

In some embodiments, a sensor 822, such as an inductive loop current sensor, is electrically coupled to the filtered AC power supply output 818. An output 824 from the sensor 822 is provided to the controller 804 to allow the controller 804 to adjust the PWFM signal 806 in response to the sensed current. The sensor output 824, in this case a closed loop feedback signal, may be used to regulate the form of the PWM or PWFM signal. In some embodiments, a battery load will present varying amounts of resistance as the battery charges. By measuring the current through the sensor 822, the controller 804 may be configured to reduce the supplied current as the battery becomes more fully charged. This may be done by decrementing the value of a fall moment (F) or incrementing one or both of a rise moment (R) and Repetition period (RP) in stored sets of R. F. and RP values as the resistance increases. Similarly, the core may increment the F value, or decrement one or both of the R and RP values if the resistance decreases. By incrementing and decrementing the PWFM values, an appropriate power is supplied to the power converter load 820.

In other embodiments, the controller 804 is connected to different or additional sensor inputs or to external components (not shown) such as an actuator, or some other control device and is programmed to determine an appropriate PWFM signal based on that input. In some embodiments, the controller 804 receives an input sensor signal from load 820 that is applied by the controller to regulate the duty cycle, and/or the frequency of the PWFM power output 814. In some embodiments, the controller 804 receives a command or control signal from an external component to determine the nature of the power output that is to be generated. In some embodiments, the command is an ON or OFF signal and the controller 804 provides a constant output PWFM signal. The command may optionally further indicate a particular power output level to be applied. The power 814 applied to the load may be constant or varied as determined by the PWFM signal 806 from the controller 804. In some embodiments, the controller 804 includes a host (not shown), which may include, for example, a software application that is stored in memory of the controller 804 and executed by processing circuits of the controller. The software application can perform, for example, the methods of FIGS. 6A and/or 6B). The controller 804 may be of a generic type known in the field, but uniquely configured for the described implementation. The controller 804 may be implemented as, for example, digital signal processors (DSPs), digital signal controllers (DSCs) and/or central processing units (CPUs).

Figure 9:
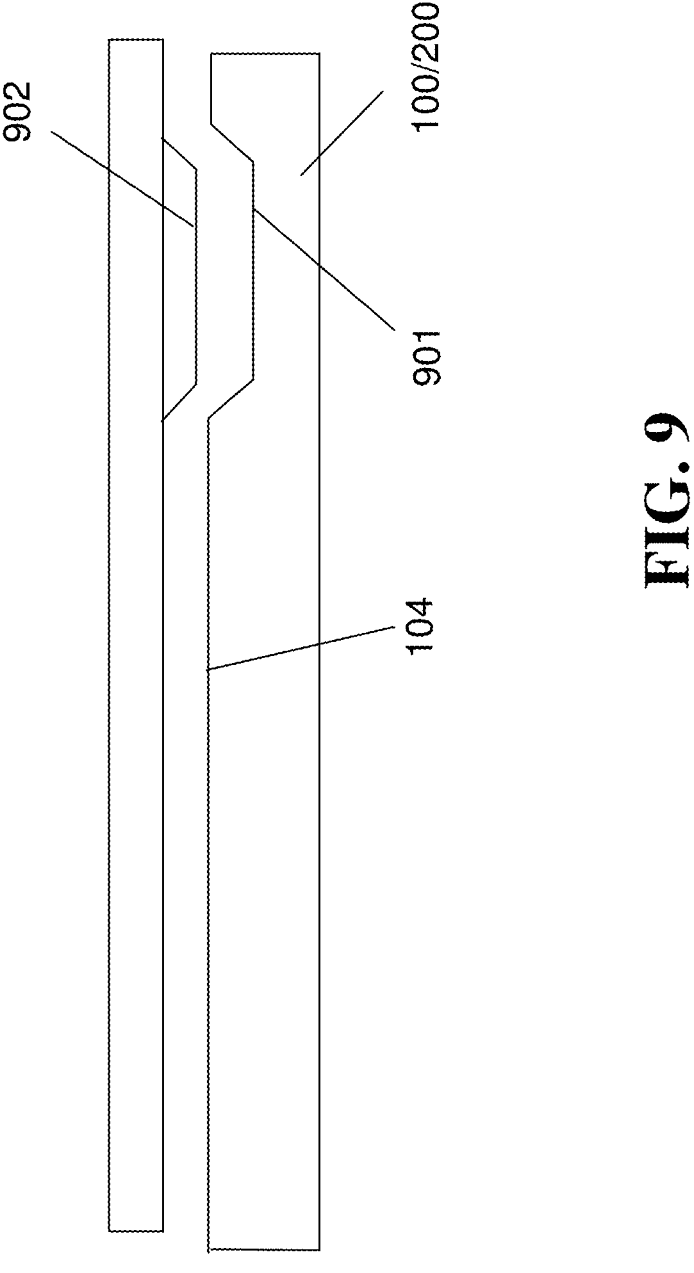
FIG. 9 shows an example, non-limiting embodiment of the wireless charger of FIG. 1, 2 or 5 comprising an indentation on the top surface thereof, in accordance with various aspects described herein.

In one example, non-limiting embodiment of the wireless charging system of the subject disclosure, a charger coil assembly that allows the wireless charging of mobile devices (e.g., smartphones) having either kind of Rx coils, i.e., N-MPP or MPP, may include an indentation 901 on the top surface 104 of the Tx charger 100 (or 200) to accommodate a protrusion 902 on the surface of the mobile device to be charged, see FIG. 9. For example, mobile devices such as smartphones include camera(s) on one surface of the phone which may be protruding. The camera(s) fit in the indentation 901 when the smartphone is placed flat on the Tx charger 100 or 200, as seen at FIG. 9. The dimensions of the indentation depend on the supported phone/camera type.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit or processing system includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

The drives and their associated computer-readable storage media provide nonvolatile storage of data, data structures, computer-executable instructions, and so forth. For a computer, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular A display unit of a device to be charged or a display unit of a Tx charger can use touch screen technology to also serve as a user interface for detecting user input. As a touch screen display, the device to be charged or the charger can be adapted to present a user interface having graphical user interface (GUI) elements that can be selected by a user with a touch of a finger. The GUI may include symbols, lighting elements or sounds, to inform the user of a message. The display can be equipped with capacitive, resistive or other forms of sensing technology to detect how much surface area of a user's finger has been placed on a portion of the touch screen display. This sensing information can be used to control the manipulation of the GUI elements or other functions of the user interface. The display can be an integral part of the housing assembly of the device or an independent device communicatively coupled thereto by a tethered wireline interface (such as a cable) or a wireless interface.

The terms "first," "second," "third," and so forth, as used in the claims, unless otherwise clear by context, is for clarity only and does not otherwise indicate or imply any order in time. For instance, “a first charging configuration” “a second charging configuration” does not indicate or imply that the first charging configuration is to be made before the second charging configuration, or vice versa, etc.

In the subject specification, terms such as “store,” “storage,” “data store,” data storage,” “database,” and substantially any other information storage component relevant to operation and functionality of a component, refer to “memory components,” or entities embodied in a “memory” or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Some of the embodiments described herein can also employ artificial intelligence (AI) to facilitate automating one or more features described herein.

As used in some contexts in this application, in some embodiments, the terms “component,” “system” and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term “article of manufacture” as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words “example” and “exemplary” are used herein to mean serving as an instance or illustration. Any embodiment or design described herein as “example” or “exemplary” is not necessarily to be construed as preferred or advantageous over other embodiments or designs. Rather, use of the word example or exemplary is intended to present concepts in a concrete fashion. As used in this application, the term “or” is intended to mean an inclusive “or” rather than an exclusive “or”. That is, unless specified otherwise or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

Moreover, terms such as “mobile”, “mobile device” (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the term “user” can refer to human entities or automated components supported through artificial intelligence (e.g., a capacity to make inference based, at least, on complex mathematical formalisms), which can provide simulated vision, sound recognition and so forth.

As employed herein, the term “processor” can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term “includes” is used in either the detailed description or the claims, such term is intended to be inclusive in a manner similar to the term “comprising” as “comprising” is interpreted when employed as a transitional word in a claim.

In addition, a flow diagram may include a “start” and/or “continue” indication. The “start” and “continue” indications reflect that the steps presented can optionally be incorporated in or otherwise used in conjunction with other routines. In this context, “start” indicates the beginning of the first step presented and may be preceded by other activities not specifically shown. Further, the “continue” indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) “operably coupled to”, “coupled to”, and/or “coupling” includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A wireless charger, comprising:

a plurality of coils, wherein at least one of the plurality of coils overlaps another coil of the plurality of coils;

a power source;

a power converter coupled to the power source and the plurality of coils;

a processing system including a processor; and a memory that stores executable instructions that, when executed by the processing system, facilitate performance of operations, the operations comprising:

scanning each of the plurality of coils for a flow of electrical current;

determining from the scanning, placement of a first device above a first coil of the plurality of coils, wherein the first coil comprises a first coil type;

receiving identification information from the first device;

determining from the identification information whether the first coil type matches a first charging configuration of the first device; and responsive to the determining that the first device needs to be placed on a second coil of the plurality of coils, generating a first message, wherein the second coil comprises a second coil type that differs from the first coil type;

wherein the first coil comprises a non-magnetic transmitter coil and the second coil comprises a magnetic transmitter coil, the magnetic transmitter coil overlapping the non-magnetic transmitter coil; wherein the magnetic transmitter coil comprises a first magnet section and a second magnetic section; and wherein the first magnetic section overlapping with the non-magnetic transmitter coil has a weaker magnetic field than the second magnetic section not overlapping with the non-magnetic transmitter coil.

2. The wireless charger of claim 1, wherein the identification information is received based on a modulation of the flow of electrical current.

3. The wireless charger of claim 1, wherein the first coil type of the first coil is configured for charging a second device having a second charging configuration, the second charging configuration differing from the first charging configuration of the first device, and wherein the identification information includes data to match the second coil type of the second coil to the first charging configuration of the first device.

4. The wireless charger of claim 1, further comprising a user interface, wherein the first message is presented at the user interface of the wireless charger, and wherein the first message instructs a user of the first device to move the first device to the second coil.

5. The wireless charger of claim 4, wherein the user interface comprises a display unit located on the wireless charger or remote to the wireless charger, and wherein the display unit comprises a liquid crystal display, a plurality of light emitting diodes, or a combination thereof.

6. The wireless charger of claim 1, wherein the operations further comprise detecting, from the scanning, placement of the first device above the second coil and initiating a charging process via the second coil to charge the first device.

7. The wireless charger of claim 6, wherein the operations further comprise:

detecting from the charging process a sub-optimal placement of the first device above the second coil; and generating a second message, the second message instructing a user of the first device to change placement of the first device above the second coil.

8. The wireless charger of claim 1, further comprising an indentation on a top surface of the second coil, the indentation accommodating a protrusion in a first surface of the first device to guide placement of the first device above the second coil.

9. The wireless charger of claim 1, further comprising a ferrite plane, wherein at least a portion of the plurality of coils is placed on an upper surface of the ferrite plane.

10. The wireless charger of claim 9, wherein the first coil comprises a first non-magnetic coil of a first shape positioned on the ferrite plane;

the first coil also comprises a second non-magnetic coil of a second shape, overlapping the first non-magnetic coil in a top view; and the second coil comprises the magnetic transmitter coil of a third shape, overlapping the second non-magnetic coil in a top view.

11. The wireless charger of claim 1, further comprising an array of magnets having an alignment configuration to guide placement of the first device over the second coil.

12. The wireless charger of claim 11, wherein the array of magnets having the alignment configuration comprises a partial circumference around the second coil.

13. The wireless charger of claim 11, wherein the array of magnets comprises neodymium magnets.

14. The wireless charger of claim 11, further comprising ferrite magnets each positioned along a partial circumference around the second coil opposite the array of magnets having the alignment configuration.

15. The wireless charger of claim 14, further comprising a ferrite wall positioned between the second coil and the array of magnets having the alignment configuration and further positioned between the ferrite magnets and the array of magnets having the alignment configuration.

16. A method, comprising:

identifying, by a processing system of a wireless charger, a transmitter coil from a plurality of transmitter coils of the wireless charger on which a receiver coil of a device has been placed upon, the processing system including a processor;

identifying, by the processing system, a transmitter coil type of the transmitter coil;

receiving, by the processing system, a signal from the device;

identifying, by the processing system, according to the signal a receiving coil type associated with the receiver coil of the device; and generating, by the processing system, a message to move the device to a different position of the wireless charger responsive to detecting a mismatch between the receiving coil type of the device and the transmitting coil type of the wireless charger, the different position including a different transmitter coil from the plurality of transmitter coils of the wireless charger, and the different transmitter coil having a different transmitter coil type that is compatible with the receiver coil type;

wherein the transmitter coil comprises a non-magnetic transmitter coil and the different transmitter coil comprises a magnetic transmitter coil, the magnetic transmitter coil overlapping the non-magnetic transmitter coil; wherein the magnetic transmitter coil comprises a first magnet section and a second magnetic section; and wherein the first magnetic section overlapping with the non-magnetic transmitter coil has a weaker magnetic field than the second magnetic section not overlapping with the non-magnetic transmitter coil.

17. The method of claim 16, wherein the operations further comprise activating, by the processing system, power charging of the receiver coil responsive to detecting placement of the device in the different position, and reducing, by the processing system, power charging of the receiver coil responsive to detecting no change in placement of the receiver coil upon the transmitter coil.

18. The method of claim 16, wherein an array of magnets of the wireless charger has an alignment configuration to guide placement of the receiving coil of the device over the different transmitter coil, wherein ferrite magnets of the wireless charger are positioned along a partial circumference around the different transmitter coil opposite the array of magnets having the alignment configuration, and wherein a ferrite wall of the wireless charger is positioned between the different transmitter coil and the array of magnets having the alignment configuration and further positioned between the ferrite magnets and the array of magnets having the alignment configuration.

19. A wireless charger, comprising:

a plurality of ferrite magnets;

a ferrite wall;

an array of magnets;

a plurality of transmitter coils; and a ferrite plane, wherein the plurality of transmitter coils is placed on an upper surface of the ferrite plane, wherein a first transmitter coil of the plurality of transmitter coils comprises a non-magnetic transmitter coil of a first shape positioned on the ferrite plane, wherein a second transmitter coil of the plurality of transmitter coils comprises a magnetic transmitter coil of a second shape, the magnetic transmitter coil overlapping the non-magnetic coil, wherein the array of magnets is positioned around a first partial circumference of the magnetic transmitter coil to guide placement of a receiver coil of a device over the magnetic transmitter coil, wherein the plurality of ferrite magnets is each positioned along a second partial circumference of the magnetic transmitter coil opposite the array of magnets, and wherein the ferrite wall separates at least a portion of the magnetic transmitter coil from the array of magnets and the ferrite magnets.

20. The wireless charger of claim 19, wherein the array of magnets comprises neodymium magnets, and wherein the wireless charger further comprises a processing system configured to detect a mismatch between the receiver coil of the device and one of the plurality of transmitter coils.

* * * * *